US009838365B2

United States Patent
Park et al.

(10) Patent No.: US 9,838,365 B2
(45) Date of Patent: Dec. 5, 2017

(54) PEER TO PEER IDENTIFIERS

(75) Inventors: Vincent D. Park, Budd Lake, NJ (US); Rajiv Laroia, Far Hills, NJ (US); Junyi Li, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 898 days.

(21) Appl. No.: 12/147,967

(22) Filed: Jun. 27, 2008

(65) Prior Publication Data

US 2009/0016524 A1 Jan. 15, 2009

Related U.S. Application Data

(60) Provisional application No. 60/948,966, filed on Jul. 10, 2007.

(51) Int. Cl.
*H04L 29/06* (2006.01)
*H04L 9/08* (2006.01)
(Continued)

(52) U.S. Cl.
CPC .......... *H04L 63/061* (2013.01); *H04L 9/0866* (2013.01); *H04L 9/0872* (2013.01);
(Continued)

(58) Field of Classification Search
CPC .... H04W 12/04; H04W 12/06; H04L 63/061; H04L 63/064; H04L 63/067;
(Continued)

(56) References Cited

U.S. PATENT DOCUMENTS 5,590,197 A * 12/1996 Chen et al. ...................... 705/65
6,904,466 B1 6/2005 Ishiyama et al.
(Continued)

FOREIGN PATENT DOCUMENTS

EP 1770535 A1 4/2007
JP 11187013 A 7/1999
(Continued)

OTHER PUBLICATIONS

Du, W.,Wang, R., Ning, P., "An efficient scheme for authenticating public keys in sensor networks" MobiHoc '05 Proceedings of the 6th ACM international symposium on Mobile ad hoc networking and computing ACM New York, NY, USA © 2005 pp. 58-67. [retrieved from ACM database on Jan. 31, 2011].*
Stoica, I.; Morris, R.; Liben-Nowell, D.; Karger, D.R.; Kaashoek, M.F.; Dabek, F.; Balakrishnan, H.; "Chord: a scalable peer-to-peer lookup protocol for Internet applications ", Networking, IEEE/ACM Transactions; Feb. 2003. vol. 11 Issue:1; pp. 17-32 [retrieved from IEEE database Nov. 30, 2011].*
(Continued)

*Primary Examiner* — Zachary A Davis
(74) *Attorney, Agent, or Firm* — James K. O'Hare

(57) ABSTRACT

In an ad hoc peer-to-peer type network during peer discovery, information relating to users of various devices is broadcast to other devices in the network, which can compromise privacy of the users. Instead of announcing a public identifier that might be known by a multitude of individuals, the user device announces a private identifier that might be known to, or determined by, a select few individuals. The individuals selected can be given a key to determine the private identifier associated with a public identifier, or vice versa, wherein that key can have a validity range or a period of time, after which the key expires. Prior to the expiration of the key, the selected individuals, through their respective devices, can detect a corresponding user and/or device by the current private identifier being announced, thus mitigating the number of people that are aware of the user's presence.

21 Claims, 10 Drawing Sheets

(51) Int. Cl.
  H04W 12/04   (2009.01)
  H04W 8/26    (2009.01)
  H04W 8/00        (2009.01)
  H04W 48/08       (2009.01)
  H04W 92/18       (2009.01)

(52) U.S. Cl.
  CPC ...... *H04L 63/0846* (2013.01); *H04L 63/0876*
          (2013.01); *H04W 8/26* (2013.01); *H04W*
          *12/04* (2013.01); *H04W 8/005* (2013.01);
                  *H04W 48/08* (2013.01); *H04W 92/18*
                                                (2013.01)

(58) Field of Classification Search
  CPC ..... H04L 63/068; H04L 63/08; H04L 63/083;
            H04L 63/0846; H04L 63/0876; H04L
              9/0861; H04L 9/0866; H04L 9/0872
  USPC .......... 380/44, 277, 278, 283; 713/168, 171;
                   709/223, 225, 227, 228; 370/310, 312
  See application file for complete search history.

(56) References Cited

U.S. PATENT DOCUMENTS

| | | | |
|---|---|---|---|
| 7,127,613 B2* | 10/2006 | Pabla et al. | 713/171 |
| 7,227,864 B2 | 6/2007 | Collins et al. | |
| 7,243,231 B2* | 7/2007 | Ellison et al. | 713/168 |
| 7,246,235 B2* | 7/2007 | Ellison et al. | 713/168 |
| 7,373,507 B2* | 5/2008 | Simms | 713/168 |
| 7,499,547 B2* | 3/2009 | Zheng et al. | 380/247 |
| 7,533,184 B2* | 5/2009 | Miller et al. | 709/236 |
| 7,596,625 B2* | 9/2009 | Manion et al. | 709/232 |
| 8,037,305 B2* | 10/2011 | Rahman et al. | 713/168 |
| 8,578,159 B2* | 11/2013 | Emeott et al. | 713/168 |
| 2003/0014637 A1 | 1/2003 | Ellison et al. | |
| 2003/0163697 A1 | 8/2003 | Pabla et al. | |
| 2004/0044911 A1* | 3/2004 | Takada et al. | 713/201 |
| 2004/0090958 A1 | 5/2004 | Park et al. | |
| 2004/0111515 A1 | 6/2004 | Manion et al. | |
| 2005/0135359 A1 | 6/2005 | Chang | |
| 2007/0165863 A1* | 7/2007 | Moosavi | 380/283 |

FOREIGN PATENT DOCUMENTS

| | | |
|---|---|---|
| JP | 2004173260 A | 6/2004 |
| JP | 2007174083 A | 7/2007 |
| TW | I228893 | 3/2005 |
| TW | I270305 B | 1/2007 |
| TW | I275276 B | 3/2007 |
| WO | 0103410 A1 | 1/2001 |
| WO | 2007012881 | 2/2007 |
| WO | WO 2007124180 A2 * | 11/2007 |

OTHER PUBLICATIONS

International Search Report, PCT/US08/069078, International Search Authority, European Patent Office, dated Oct. 29, 2008.
Written Opinion, PCT/US08/069078, International Search Authority, European Patent Office, dated Oct. 29, 2008.
Taiwan Search Report—TW097126148—TIPO—Feb. 6, 2012.

* cited by examiner

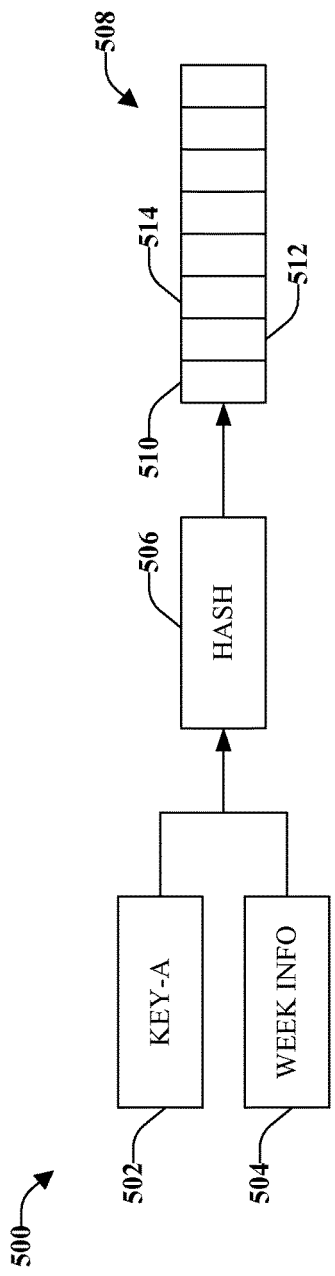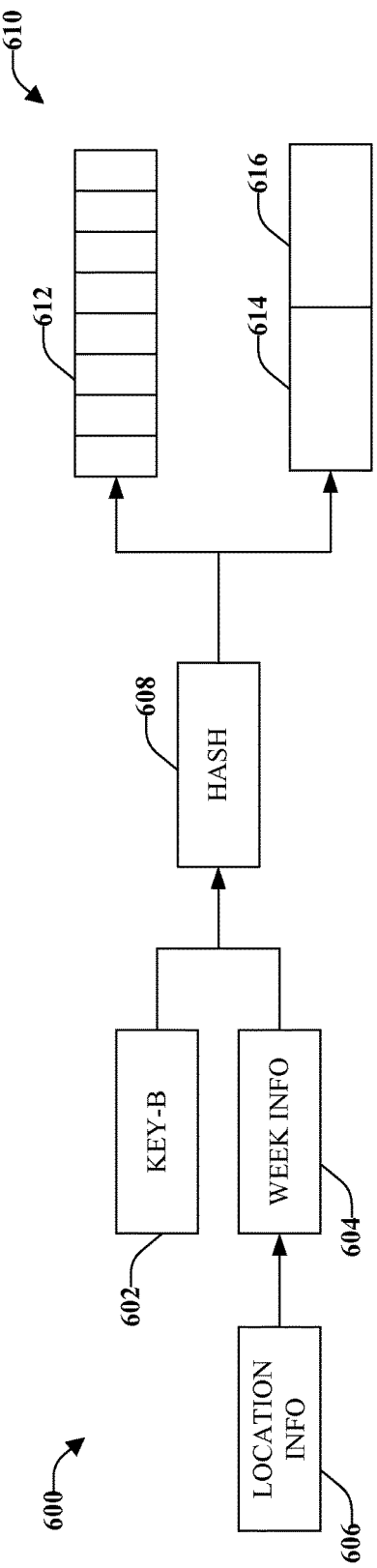
FIG. 5
FIG. 6

PEER TO PEER IDENTIFIERS

CROSS-REFERENCE

This application claims the benefit of U.S. Provisional Application Ser. No. 60/948,966, filed Jul. 10, 2007, entitled "PEER TO PEER IDENTIFIERS," assigned to the assignee hereof and the entirety of which is incorporated herein by reference.

BACKGROUND

I. Field

The following description relates generally to wireless communications, and more particularly to peer discovery in ad hoc peer-to-peer networks.

II. Background

Wireless communication systems or networks are widely deployed to provide various types of communication; for instance, voice and/or data may be provided through wireless communication systems. A typical wireless communication system, or network, can provide multiple users access to one or more shared resources. For instance, a system may use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Wireless communication networks are commonly utilized to communicate information regardless of where a user is located (inside or outside a structure) and whether a user is stationary or moving (e.g., in a vehicle, walking). Generally, wireless communication networks are established through a mobile device communicating with a base station, access point, or access router. The access point covers a geographic range or cell and, as the mobile device is operated, it may move in and out of these geographic cells.

Some networks can be constructed utilizing solely peer-to-peer communication without utilizing base stations, access points, or access routers. Such networks are sometimes referred to as ad hoc networks. Communication in such networks may, in some cases, be limited to exchanges between devices that are within direct wireless transmission range of each other, while in other cases multi-hop forwarding between non-adjacent devices may be supported. Various techniques may be used to maintain connectivity and/or forwarding information as the topology of the network changes (e.g., as devices join, leave, or move). Some networks can also be constructed utilizing a combination of peer-to-peer nodes, base stations, access points, or access routers.

As devices move in and out of networks, the potential for higher layer communications with other devices may be determined based on a process of peer discovery. To enable peer discovery, information associated with a device (e.g., identifier, how to establish communication, and so forth) is advertised or announced (e.g., broadcast) to other devices within range. This can compromise anonymity and can lead to privacy concerns.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with facilitating assignment of a first identifier based on a second identifier to increase security. A peer can be explicitly chosen to receive a key associated with the first identifier, and, having knowledge of the first identifier and the key, can determine the second identifier. As such, the peer can establish communication with the sending device. The key can have an associated validity range, after which the key expires. According to some aspects, the first identifier is a public identifier and the second identifier is a private identifier.

An aspect relates to a method for transmitting peer discovery information. The method includes generating a plurality of keys associated with a first identifier and communicating the first identifier and at least one key of the plurality of keys to a first peer node. The method also includes deriving a second identifier as a function of the first identifier and the at least one key of the plurality of keys and advertising the second identifier to a plurality of peer nodes.

Another aspect relates to a wireless communications apparatus comprising a memory and a processor. The memory retains instructions related to generating a plurality of keys associated with a first identifier and communicating the first identifier and at least one key of the plurality of keys to a first peer node. The memory also retains instructions related to deriving a second identifier as a function of the first identifier and the at least one key of the plurality of keys and advertising the second identifier to a plurality of peer nodes. The processor is coupled to the memory and configured to execute the instructions retained in the memory.

Still another aspect relates to an apparatus comprising a means for creating a plurality of keys associated with a first identifier and a means for conveying the first identifier and at least one key of the plurality of keys to a first peer node. The apparatus also includes a means for deriving a second identifier as a function of the first identifier and the at least one key of the plurality of keys and a means for advertising the second identifier to a plurality of peer nodes.

A further aspect relates to a computer program product comprising a computer-readable medium. The computer-readable medium includes a first set of codes for causing a computer to generate a plurality of keys associated with a first identifier and a second set of codes for causing the computer to communicate the first identifier and at least one key of the plurality of keys to a first peer node. The computer-readable medium also includes a third set of codes for causing the computer to derive a second identifier as a function of the first identifier and the at least one key of the plurality of keys and a fourth set of codes for causing the computer to advertise the second identifier to a plurality of peer nodes.

Another aspect relates to at least one processor configured to transmit peer discovery information. The processor includes a first module for creating a plurality of keys associated with a first identifier and a second module for communicating the first identifier and at least one key of the plurality of keys to a first peer node. Also included in the processor is a third module for deriving a second identifier as a function of the first identifier and the at least one key of the plurality of keys and a fourth module for advertising the second identifier to a plurality of peer nodes.

A further aspect relates to a method for receiving peer discovery information. The method includes receiving a first identifier and at least one key associated with a peer node and determining a second identifier based at least in part on the first identifier and the at least one key. The method also includes monitoring for receipt of the second identifier.

Yet another aspect relates to a wireless communications apparatus comprising a memory and a processor. The memory retains instructions related to receiving a first identifier and at least one key associated with a peer node, determining a second identifier based at least in part on the first identifier and the at least one key, and monitoring for receipt of the second identifier. The processor is coupled to the memory and is configured to execute the instructions retained in the memory.

Still another aspect relates to an apparatus comprising a means for receiving a first identifier and at least one key associated with a peer node. Also included in the apparatus is a means for determining a second identifier based at least in part on the first identifier and the at least one key and a means for monitoring for receipt of the second identifier.

Another aspect relates to a computer program product comprising a computer-readable medium. The computer-readable medium includes a first set of codes for causing a computer to receive a first identifier and at least one key associated with a peer node. The computer-readable medium also includes a second set of codes for causing the computer to determine a second identifier based at least in part on the first identifier and the at least one key and a third set of codes for causing the computer to monitor for receipt of the second identifier.

Still another aspect relates to at least one processor configured to transmit peer discovery information. The processor includes a first module for receiving a first identifier and at least one key associated with a peer node and a second module for determining a second identifier based at least in part on the first identifier and the at least one key. Also included is a third module for monitoring for receipt of the second identifier and a fourth module for receiving an identifier advertised by a nearby node. A fifth module for ascertaining if the received identifier is the determined second identifier is also included in the processor.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of the various aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

FIG. 5 illustrates an example of deriving a lower level key based on a higher level key and some known information.

FIG. 6 illustrates an example of deriving one or more lower-level keys based on a higher level key and at least two distinct pieces of known information.

DETAILED DESCRIPTION

Figure 1:
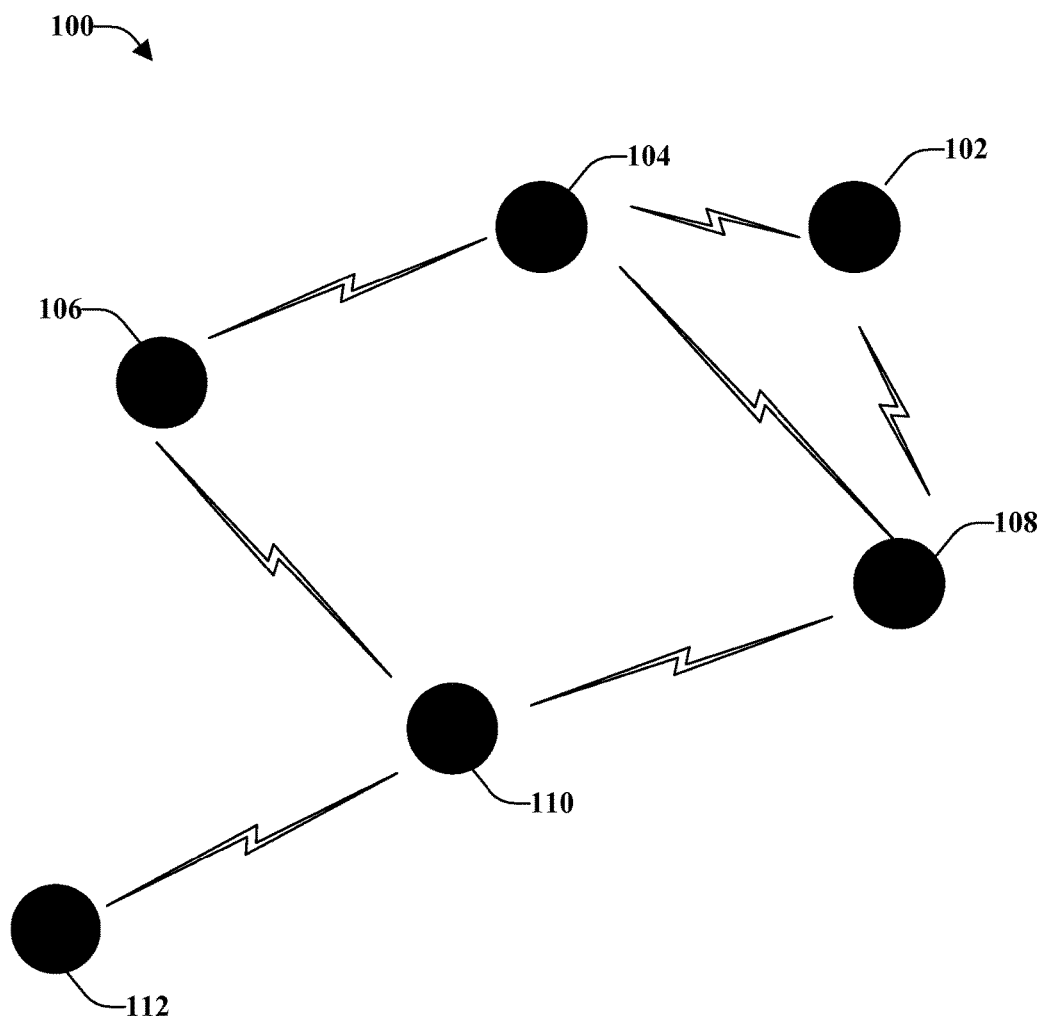
FIG. 1 illustrates a wireless communication network in accordance with various aspects presented herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal. A wireless terminal can also be called a system, subscriber unit, subscriber station, mobile station, mobile, mobile device, device remote station, remote terminal, access terminal, user terminal, terminal, wireless communication device, user agent, user device, or user equipment (UE). A wireless terminal may be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, and/or another processing device for communicating over a wireless system. Moreover, various aspects are described herein in connection with a base station. A base station may be utilized for communicating with wireless terminal(s) and may also be referred to as an access point, Node B, or some other terminology.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a wireless communication network 100 is illustrated in accordance with various aspects presented herein. Network 100 can be an ad hoc wireless communication network and can support peer-to-peer communications. During peer-to-peer communication, nodes, devices, terminals or stations may communicate directly with each other, as opposed to using base stations, access points, and/or access routers to relay or forward communications. In some such networks, devices within the network can relay or forward traffic destined to other devices. Some ad hoc networks can include both terminals and access points.

Network 100 can include any number of mobile devices or nodes, of which six are illustrated, that support wireless communication. Mobile devices can be, for example, cellular phones, smart phones, laptops, handheld communication devices, handheld computing devices, satellite radios, global positioning systems, PDAs, and/or any other suitable device for communicating over wireless communication system 100. Nodes, as used herein, include mobile devices, access points, base stations, access routers, or the like.

Nodes 102, 104, 106, 108, 110, and 112 are illustrated as configured in a peer-to-peer ad hoc topology. Each node can be within range of one or more other nodes and can communicate with the other nodes or through utilization of the other nodes, such as in a multi-hop topology (e.g., communications can hop from node to node until reaching a final destination). For example, a sender node 102 may wish to communicate with receiver node 112. To enable packet transfer between sender node 102 and receiver node 112, one or more intermediate nodes 104, 106, 108, and/or 110 can be utilized. It should be understood that any node 102-112 can be a sender node and/or a receiver node and can perform functions of either sending or receiving information at substantially the same time (e.g., can broadcast or communicate information at about the same time as receiving information). It should also be understood that any node 102-112 could also provide access to other communications infrastructure, such as a wired network (not shown), and in some cases can function similar to an access point.

Periodically or based on other criteria, a node (referred to herein as sending node or sending device) can broadcast or announce its presence to other nodes within its range, which can be utilized during peer discovery. Nodes that receive the presence information (referred to herein as receiving nodes or receiving devices) are aware of the existence of the sending node based on the information received. Such nodes can determine whether to establish communication with the sending node based on the received information. It should be understood that although nodes within a communication network 100 might not be able to distinguish the other nodes within the communication network (e.g., know the user, service, function, interest, etc. associated with a particular node), the presence (or existence) of the other nodes is known. Thus, if there are conversations occurring, the conversations can be coordinated to take into account various factors including bandwidth capabilities, interference mitigation and other concerns.

Information announced during peer discovery can include information relating to the user of the node or device (e.g., sending device), an application executing on the sending node or device, a service provided by the sending node or device, and so forth, and can be conveyed as a public or private identifier. In various situations, the user of a sending device might not wish to have certain individuals (e.g., users of other receiving devices) become aware of their presence (e.g., to maintain a level of anonymity). In other situations, users of the sending device might desire another individual (e.g., user of receiving device) to be aware of their presence, but only for a limited duration. Thus, nodes 102-112 can be configured to explicitly allow various receiving nodes to recognize a sending node based on knowledge of a first identifier associated with the sending node and keys selectively distributed to receiving nodes to allow such nodes to derive a second identifier (e.g., know when their buddies, friends, colleagues, associates, etc. are within a similar geographic area) being broadcast by the sending node at a particular moment. In accordance with some aspects, the first identifier is a public identifier and the second identifier is a private identifier.

A key is a data string that, when combined with source data (e.g., according to an algorithm) produces an output that is unreadable until decrypted. The keys derived from the first identifier can be distributed with various expiration periods (e.g., a particular device can obtain the key for a year while another device can obtain the key for only three months). Additionally or alternatively, the keys and/or algorithms might include location parameters. Other parameters (e.g., a group the user belongs to, a game the user desires to participate in, a certain type of person the user desires to meet and so forth) or a combination of parameters might be utilized. In accordance with some aspects, the keys or other information distributed to one or more receiving devices can be revoked at any time, even before a key validity range or period has expired.

As devices or nodes move around in network 100, the other devices or nodes should be using a similar communication technology. Each receiving device can obtain knowledge of the other devices (e.g., sending devices) in the vicinity and corresponding identifiers associated with each device during peer discovery. However, a receiving device (and user of the device) might not know to whom those identifiers belong (e.g., cannot distinguish one identifier from another) since the identifiers announced or broadcast can be private identifiers, not publicly known identifiers. However, through utilization of the disclosed aspects, when a user of a receiving device is seeking a colleague's identifier, the user's device (e.g., receiving device) can know specifically which private identifier the colleague's device (e.g., sending device) should be broadcasting based on deriving various keys from a combination of a public identifier and a distributed, known key.

The private identifiers can change over time and can be determined or derived from a hierarchy of keys previously distributed to a receiving device for a particular interval (e.g., before the distributed key expires). Such periodic changes mitigate the chances that an individual can be tracked or other security issues. For example, if a rogue user follows someone (e.g., innocent user) around for a while (e.g., tracking period), the rogue user might be able to ascertain a private identifier associated with the innocent user. For example, the rogue user can review the identifiers received during the tracking period and, if the same identifier is always present while other identifiers vary, the rogue user can ascertain which identifier belongs to the innocent user. To mitigate such tracking, the identifiers can be randomly changed at periodic or predetermined intervals. Thus, the identifier can be changing at a certain frequency and in a random manner so that tracking is more difficult.

A sending device can also receive a distributed key from a receiving device in order for the sending device to be able to associate a second identifier announced by the receiving device with a first identifier. A single device can perform functions of both sending peer discovery information and receiving peer discovery information in accordance with the various aspects disclosed herein.

Figure 2:
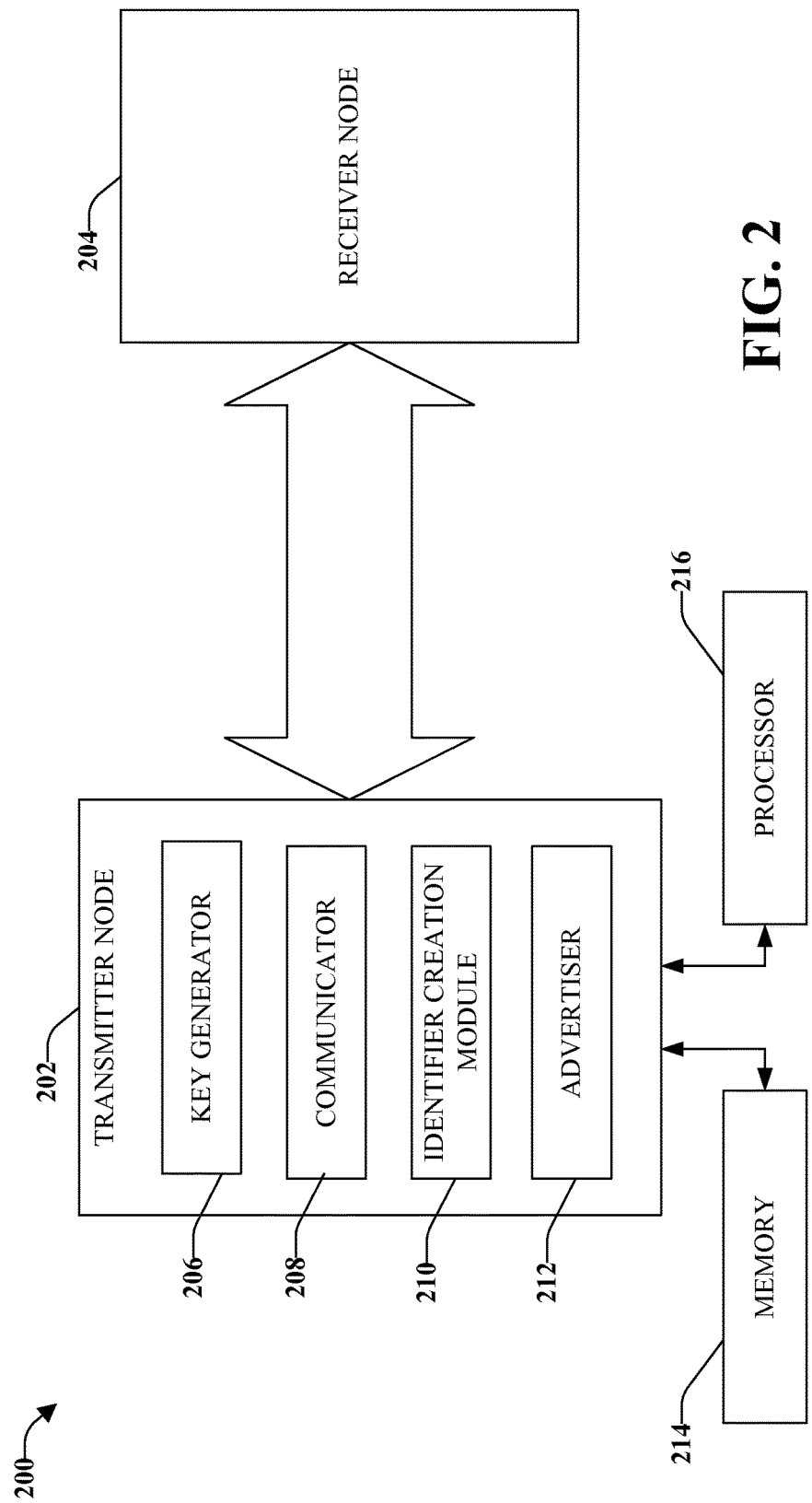
FIG. 2 illustrates a system that generates and selectively distributes the information to facilitate peer discovery.

Turning to FIG. 2, illustrated is a system 200 that generates and selectively distributes information to facilitate peer discovery. System 200 can be configured to allow device users, applications and/or services to have their presence announced for a specified interval to other selected device users, applications and/or services, thus adding a level of security. The presence can be announced by system 200 in a manner that retains privacy to the user whose presence is being announced to a select group of individuals. For example, a well-known personality, such as an actor, might want to spend a day visiting various areas or shopping and might not want everyone within the vicinity to know his location. System 200 can selectively announce his presence to a circle of friends through selective key distribution.

In further detail, system 200 includes a transmitter node 202 that announces or broadcasts its presence to a receiver node 204. It should be understood that more than one transmitter node 202 and receiver node 204 can be included in system 200; however, one of each is shown and described for purposes of simplicity. Transmitter node 202 can announce or broadcast various information including an identification, how to utilize the services of transmitter node 202 in order to communicate within an ad hoc peer-to-peer network, and other information.

In accordance with some aspects transmitter node 202 can perform the functions of receiver node 204 and receiver node 204 can perform the functions of transmitter node 202. That is to say, a single node can both transmit and receive information in accordance with the one or more aspects disclosed in this detailed description. In such a manner, a node can be broadcasting information and at substantially the same time can also be receiving information from other nodes in the vicinity as well as performing other functions (e.g., communicating, relaying information and so forth).

Each node participating in the peer-to-peer network can have a relatively permanent and publicly known identifier (e.g., first identifier), such as a network access identifier (e.g., john.doe@isp.com) or an Internet Protocol (IP) address. This permanent and publicly known identifier can be transformed into a private identifier (e.g., second identifier) that is advertised as part of the peer discovery process to allow the node user to retain a level of privacy.

To selectively convey presence information, transmitter node 202 can include a key generator 206 that creates a multitude of keys associated with a first identifier. At least one of the keys is associated with a validity period, a geographic region, or combinations thereof. For example, each key is valid on a temporary basis and can expire at a predetermined frequency or interval (e.g., minutes, hours, days, or other intervals, which may or may not be temporal-based). In some instances, a key can be derived as a function of a secure hash of another key and some other information (e.g., time information, location information, group information, gaming information, or combinations thereof). In accordance with some aspects, the multitude of keys can create a hierarchy of keys, which will be discussed in further detail below.

Transmitter node 202 also includes a communicator 208 that transmits the first identifier and at least one key of the multitude of keys to a first peer node. The first peer node is a node that should receive information to allow detection of presence (e.g., receive a distributed key). The first identifier and keys can be communicated in a secure manner. In accordance with some aspects, the communicator 208 transmits the first identifier and at least a second key (different from the at least one key transmitted to the first peer node) to a second peer node.

For example, for a family member, continuous monitoring might be desired (e.g., one year). However, for colleagues at work, it might be desired to allow monitoring for only a month. For some individuals (e.g., blind date) a shorter interval might be desired (e.g., 6 hours). Thus, different keys can be distributed to different peers or nodes based on a desired duration.

It should be understood that keys can be distributed using a variety of known techniques, some of which may be effectively out of band (e.g., conveyed through physical exchange of recorded media or through a combination of verbal communication and manual configuration). For example, a famous person might be walking around with her device but does not want to continuously advertise that she is in the vicinity. However, she wants a few trusted friends to be able to detect her presence. Each selected friend can receive a key that allows their respective devices to derive a second identifier that the famous person is announcing based on knowledge of her first identifier and the distributed key.

The determination of which devices or nodes should be distributed a key can be made based on a manual entry (e.g., selection of one or more contacts from a listing) or it can be based on other factors (e.g., a node with which transmitting node 202 is currently communicating). A determination of which key should be distributed to a particular node or peer can be made based on a predetermined interval, whereby after expiration of the interval, the selected nodes are no longer able to derive the private identifier.

A second identifier is derived by an identifier creation module 210. The second identifier is derived as a function of the first identifier and the one or more keys. In accordance with some aspects, the second identifier is derived as a function of the first identifier and at least two keys of the plurality of keys.

The second identifier is transmitted to a multitude of peer nodes by an advertiser 212. The second identifier can be transmitted for peer discovery purposes. Advertising the second identifier can comprise a wireless transmission that includes the second identifier. In accordance with some aspects, the first identifier is a public identifier and the second identifier is a private identifier.

In accordance with some aspects, subsequent identifiers (e.g., third identifier, fourth identifier, and so forth) are derived by identifier creation module 210 based on a key that is different from the key utilized for a previous identifier (e.g., second identifier). The different key can correspond to different intervals of time and/or geographic regions than the key used for one or more previous identifiers. For example, a previous identifier needs to be changed because it has been compromised, a time interval associated with the identifier has expired, or for other reasons. In accordance with some aspects, a key utilized to derive the previous and the subsequent identifiers is based on a higher key in a hierarchy (e.g., week one key and week two key are both derived from the same month key). Advertiser 212 can transmit the subsequent identifier(s) that are created by identifier creation module 210. In accordance with some aspects, the previous key(s) can be rendered invalid after creation of a subsequent key.

According to some aspects, transmitter node 202 can utilize various algorithms, methods, and/or techniques to create the second (and subsequent) identifier(s) that is advertised (e.g., broadcast), to enable peer discovery. For example, transmitter node 202 can create the second (and subsequent) identifier(s) based on a secure hash of the first (or previous) identifier and a security key (e.g., where the security key has been previously conveyed to explicitly related peers) or based on other encryption techniques. In accordance with some aspects, transmitter node 202 can change the keys periodically or based on a predetermined interval.

One or more keys can be assigned to different peers at substantially the same time, even if such peers have different durations for which they have access to the personal identifier. For example, a transmitter node 202 moves from one geographic area or range to another geographic area. At substantially the same time as entering a new geographic area and/or periodically, the transmitter node 202 announces its presence by transmitting a second identifier associated with the transmitting node 202. The second identifier can be received by one or more receiver nodes 204 within range of transmitter node 202. Some of the receiver nodes 204 do not know (or cannot determine) the second identifier, and ignore the information or do not know the identity of the device. Other receiver nodes 204 can have information relating to the second identifier (based on knowing the first identifier and the distributed key) and, if desired, communications can be established between transmitter node 202 and receiver node 204.

In accordance with some aspects, the distributed key can be selectively revoked prior to an expiration of a validity range associated with the distributed key. The validity range should have a starting point and an ending point. A multitude of means can be utilized to establish the validity range and is not limited to a duration of time, although it is easy to think of a validity range in terms of time. Thus, it is not necessary that the validity range be related to real time, although it may be. The validity range could be a numbered sequence or a range that is generated by a hash function. The validity range can be temporal-based, numerical-based, or based on other criteria or combinations thereof, provided there is a system, method or other means for determining when the validity range starts and ends.

A memory 214 can be operatively coupled to transmitter node 202 to encode and distribute keys associated with a second identifier. Memory 214 can store information and/or retain instructions related to generating a multitude of keys associated with a first identifier and communicating the first identifier and at least one key of the multitude of keys to a first peer node. Memory can also retain instructions related to deriving a second identifier as a function of the first identifier and at least one key of the plurality of keys and advertising the second identifier to a plurality of peer nodes.

A processor 216 can be operatively connected to transmitter node 202 and/or memory 214 to facilitate analysis of received information and/or can be configured to execute the instructions retained in memory 214. Processor 216 can be a processor dedicated to analyzing information received from transmitter node 202 and/or to generating information that can be utilized by components of transmitter node 202. Additionally or alternatively, processor 216 can be a processor that controls one or more components of system 200, and/or a processor that analyzes information, generates information and/or controls one or more components of system 200.

Figure 3:
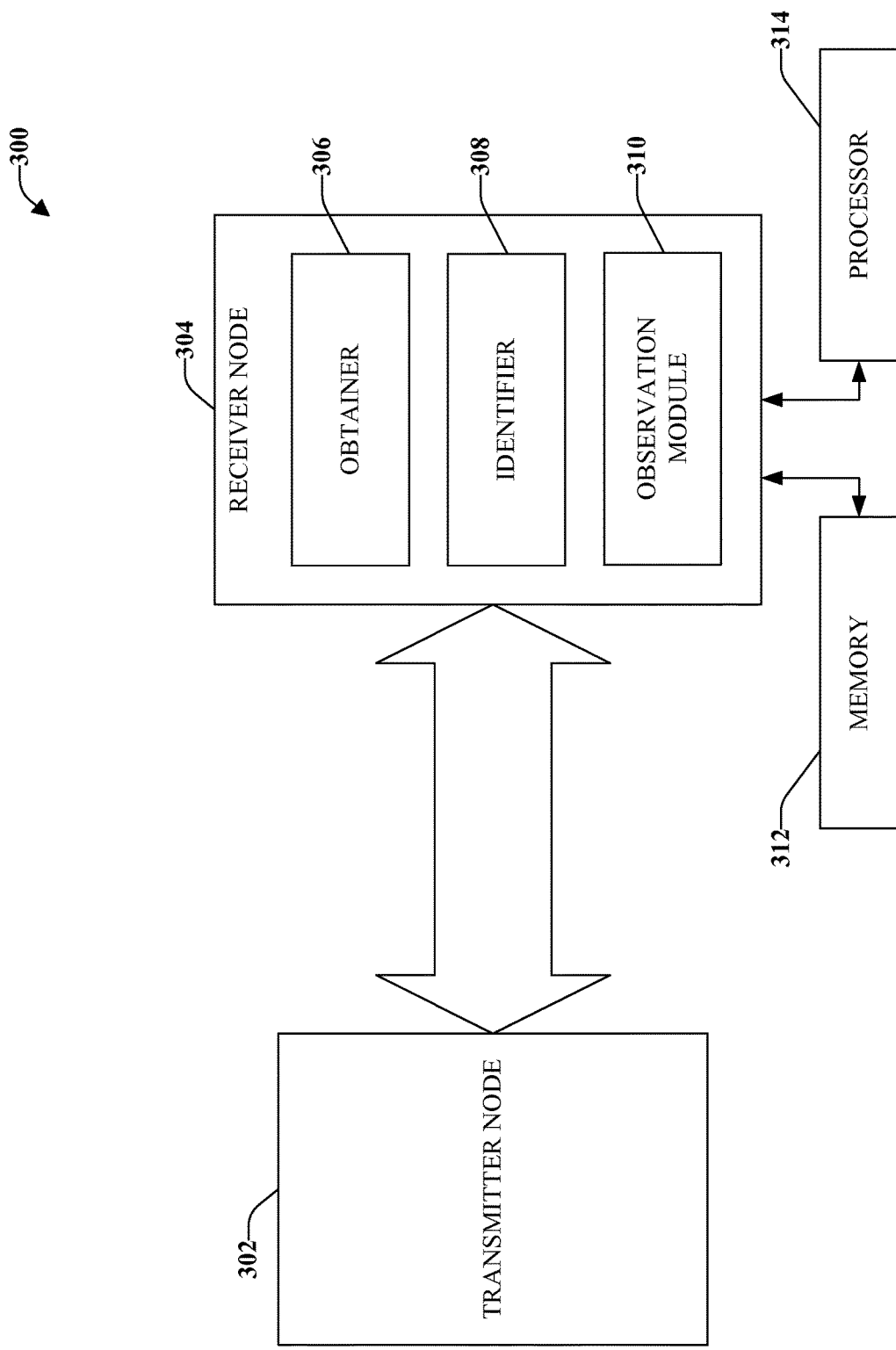
FIG. 3 illustrates an example system that monitors peer discovery information.

Now referring to FIG. 3, illustrated is an example system 300 that receives a cryptographic key and performs peer discovery based in part on using the key to determine an association between a first identifier and a corresponding second (or subsequent) identifier used for peer discovery. System 300 can be configured to discover one or more peers during a peer discovery period and selectively establish communications with the one or more peers. A hierarchy of keys can be associated with a known first identifier for the purpose of determining a second (and subsequent) identifier(s) to be used for the purpose of peer discovery. The hierarchy of keys can relate to predetermined durations or intervals during which a cryptographic key is valid. A key within the hierarchy can become invalid due to an expiration of an interval. A peer that has a key that is higher in the hierarchy (e.g., has a longer duration) can derive each key below it in the hierarchy (e.g., where each such key corresponds to a subset of the time period associated with the higher key from which it is derived).

In more detail, system 300 includes a transmitter node 302 that can communicate with a receiver node 304, such as in a peer-to-peer type ad hoc network. There can be more than one of each node 302, 304, however only one of each is shown for purposes of simplicity. The nodes 302, 304 can become aware of other nodes within a geographic region during a peer discovery period during which the nodes 302, 304 announce information relating to respective identifiers and other information that allows the nodes 302, 304 to communicate. The nodes 302, 304 can assign keys having different validity ranges. For example, transmitter node 302 might give receiver node 304 a key for three hours but receiver node 304 might give transmitter node a key for only one hour.

In order to maintain privacy for a user of transmitter node 302 (or receiver node 304), a second identifier can be associated with transmitter node 302 based on a first identifier. For example, a user might be known by a first identifier (e.g., joe.smith@work.com), which at a given time is associated with a particular second identifier (e.g., a pseudo random hexadecimal value 0xA65D820C). As the user moves from place to place, there might be a level of privacy desired whereby not everyone within the vicinity utilizing the ad hoc network is aware or notified of the user's presence. In accordance with some aspects, the user might want certain individuals to obtain presence information for a limited interval or validity range. A multitude of means can be utilized to establish the validity range and is not limited to a duration of time, although it is easy to think of a validity range in terms of time.

A user of transmitter node 302 can select other nodes 304 that can receive keys associated with the first identifier as well as a validity range during which the keys can be used to determine an association between the first identifier and a corresponding second identifier (or subsequent identifiers) used for peer discovery, thus enabling other nodes 304 to detect the presence of the entity associated with the first identifier and transmitter node 302. Receiver node 304 can receive keys associated with the identifier while operating in a peer-to-peer network that includes both transmitter node 302 and receiver node 304. In accordance with some aspects, receiver node 304 can receive the keys though an infrastructure network (e.g., a network that utilizes base stations) or through other means (e.g., through physical exchange of recorded media or through a combination of verbal communication and manual configuration).

A multitude of techniques can be utilized to distribute the keys such as a private-public key exchange, a Diffie-Hellman (D-H) key exchange, or other manners of exchanging keys in a secure fashion. According to some aspects, the second (or subsequent) identifier can be determined based on a secure hash of the first (or previous) identifier and a security key (e.g., the security key has been previously conveyed or a security key derived at least in part from a security key that has been previously conveyed).

Figure 4:
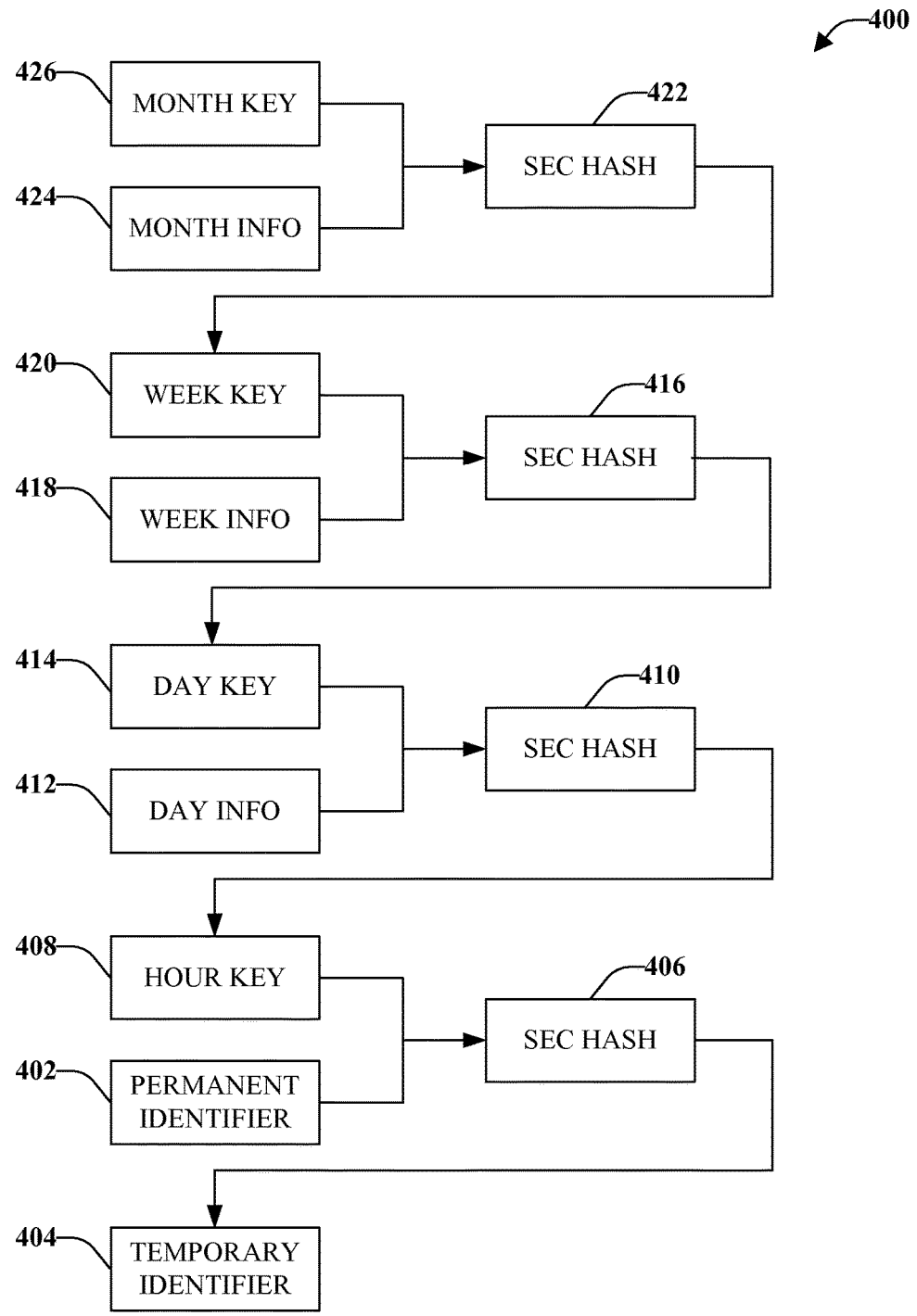
FIG. 4 illustrates security keys with differing periods of usability.

Aspects relating to keys associated with determining an association between a first (or previous) identifier and a corresponding second (or subsequent) identifier are illustrated in FIG. 4, which depicts security keys 400 with differing periods of usability. The security keys 400 can be utilized to support peer relationships of different durations. It should be understood that the security keys 400 illustrated are for example purposes only and other security keys can be utilized. Thus, while the security keys 400 shown and described relate to time-based periods for purposes of simplicity, the disclosed aspects are not limited to durations of time. For example, a range associated with security keys 400 can be temporal-based, location-based, numerical-based or based on other criteria, provided there is a system, method or other means for determining when the validity range starts and ends.

At a given time and/or during a given time interval, a permanent identifier 402 can be associated with a temporary identifier 404. The temporary identifier 404, corresponding to the permanent identifier 402, can change with time, thus, the temporary identifier can be described as temporary or transient as compared to the relatively permanent identifier. For purposes of this example, time durations of hour, day, week and month will be discussed. However, as previously stated other criteria can be utilized to establish validity periods. The temporary identifier 404 can be determined by executing a secure hash operation 406 on the permanent identifier 402 with a key that is only valid for the current hour 408. The hour key 408 can be conveyed to a peer that should only be able to perform discovery for an hour.

The hour key 408 can be determined by executing a secure hash operation 410 on some day information 412 (e.g., pseudo random information corresponding to the day), with a key that is valid for the day 414. It should be noted that the operation on the day information 412 with the day key 414 could produce a set of hour keys (e.g., one key for each hour of the day). A peer to which the day key 414 has been conveyed can determine the hour key 408 for each hour of the day and, thus, the temporary identifier 404 used for peer discovery during each hour of the day.

In a similar manner, the day key 414 can be determined by executing a secure hash operation 416 on some week information 418 (e.g., pseudo random information corresponding to the week) with a key that is valid for the week 420. Some peers may be given the week key 420 that enables determination of the temporary identifiers used through the week. In a similar manner, the week key 420 can be ascertained by performing a secure hash operation 422 on some month information 424 (e.g., pseudo random information corresponding to the month) with a key that is valid for the month 426. Some peers may be provided the month key 426 that enables determination of the temporary identifiers used throughout the month. It should be noted that the operation on the week information 418 with the week key 420 could produce a set of day keys (e.g., one key for each day of the week). Additionally, the operation on the month information 424 with month key 426 could produce a set of week keys (e.g., one key for each week in the month). In each case where a secure hash is used to derive one key (or a set of keys) from another key, a variety of alternative techniques for key derivation is possible. Furthermore, the key derivation process can incorporate additional or alternative information in the computation.

A peer given the month key 426 can determine each key lower in the hierarchy to derive a current temporary key used for determining an association between the permanent identifier and a temporary identifier. A peer that knows the week key 420 can derive the respective day keys and hour keys, which are lower in the hierarchy. In a similar manner, a peer with the day key 414 can derive the respective hour keys 408 for the validity periods of the day. Thus, knowledge of a key within a hierarchy can supply information needed to derive keys lower in the hierarchy.

Keys cannot be used to derive keys higher in the hierarchy. Thus, a peer with the week key 420 cannot derive the month key 426; a peer with the day key 414 cannot derive the week key 420 or month key 426 and a peer knowing the hour key 408 cannot determine the keys 414, 420, 426 for a longer validity period. Thus, as the end range associated with a duration of a supplied key expires, a peer desiring to establish a peer-to-peer communication with the user associated with distributed keys needs to have the keys explicitly assigned in accordance with the disclosed aspects. In such a manner, the temporary identifier can be explicitly conveyed to related peers and is valid for a limited time. In accordance with some aspects, the keys can be implicitly revoked prior to the expiration of the validity range.

Referring again to FIG. 3, in order to accept one or more keys and associated validity ranges, if any, receiver node 304 can include an obtainer 306 that can receive a first identifier and at least one key associated with a peer node. The received key can be associated with a validity range that indicates a validity period having a starting point and an ending point.

Also included is an identifier 308 that can determine a second identifier based, at least in part, on the first identifier and the at least one key. The second identifier can be determined based partially on time, partially on location, or combinations thereof. In accordance with some aspects, determining the second identifier includes generating at least one additional key. The additional key can be associated with a specific validity period, geographic region, or combinations thereof. According to some aspects, the additional key forms a hierarchy.

An observation module 310 can monitor for receipt of the second identifier. In accordance with some aspects, monitoring receipt of the second identifier includes receiving an identifier advertised by a nearby node and determining if the received identifier is the second identifier (e.g., the nearby node is a related peer). According to some aspects, monitoring receipt includes receiving a wireless transmission.

It should be understood that, depending on the specific security mechanism in use and/or other factors, the receiver node 304 can either use a first identifier of a peer together with an associated key to determine the second identifier to be used for peer discovery and, thus, monitor peer discovery transmissions for the second identifier, or use a second identifier received through a peer discovery transmission together with a key associated with the first identifier of a peer to determine if a received identifier corresponds to the first identifier.

In accordance with some aspects, if the second identifier is to be changed due to various reasons (e.g., the second identifier has been compromised), a third identifier can be derived. The third (or subsequent) identifier can be related to the second (or previous) identifier but is based on a different key (e.g., the third identifier and key corresponds to a different interval of time and/or geographic region). The switch over from the second key to the third key can be based on knowing a key that is higher in the hierarchy. For example, the second key is a key for week one and a third key is a key for week two. Both the second key and the third key were derived from a month key, which is known to receiver node 304, which can derive the lower level keys (e.g., second key and third key).

A memory 312 can be operatively coupled to receiver node 304 to decode a second identifier associated with a transmitter node. Memory 312 can store information and/or retain instructions related to receiving a first identifier and at least one key associated with a peer node, determining a second identifier based at least in part on the first identifier and at least one key, and monitoring for receipt of the second identifier. Memory 312 can further retain instructions related to retaining information associated with a cryptographic key. Memory 312 can further retain instructions related to receiving information regarding a presence of a peer node when in a certain geographic range (e.g., a peer node and a receiver node are within range of each other).

A processor 314 can be operatively connected to receiver node 304 and/or memory 312 to facilitate analysis of received information and/or can be configured to execute the instructions retained in memory 312. Processor 314 can be a processor dedicated to analyzing information received from transmitter node 302 and/or generating information that can be utilized by obtainer 306, identifier 308, and/or verifier 310. Additionally or alternatively, processor 314 can be a processor that controls one or more components of system 300, and/or a processor that analyzes information, generates information and/or controls one or more components of system 300.

For example purposes and not limitation, users might be embarking on a cruise and during the cruise the various individuals on the ship might not have access to an infrastructure (e.g., base station) since they are on the ocean, away from land. However, they can have access to a peer-to-peer network that can have an associated cost structure or other means of controlling the communication. For example, the users might sign up for five days and during those five days identified people (e.g., on the cruise) can communicate with them. The various users might not want other people on the cruise communicating with them and/or tracking them. Thus, temporal keys can be distributed to the selected individuals allowing those individuals to determine the association between the public identifier and a corresponding private identifier used for the purpose of peer discovery. In this manner, selected individuals can detect presence while mitigating others from doing so.

Now referring to FIG. 5, illustrated is an example 500 of deriving a lower level key based on a higher level key and some known information. A device or node can obtain a key at some level in a hierarchy (e.g., a hour key is higher in a hierarchy than a minute key; a year key is higher in a hierarchy than a day key). In some instances, in order to derive lower level keys, if any, additional information is needed, which can be time-based, location based, based on other criteria, or combinations thereof. A device can be given a Key, such as Key-A 502, which for this example is a key corresponding to a particular week. From Key-A 502, the device can include some week information 504, which can be ascertained from a calendar or other timing sources. Key-A 502 and week information 504 are processed through a secure (e.g., one-way) hash algorithm 506 (although other techniques can be utilized), which produces an output 508. The output 508 can be divided into sections or sub-portions, which can be a function of Key-A 502 and week information 504. For example, a first portion can be a Sunday key 510, a second portion can be a Monday key 512, a third portion can be a Tuesday key 514, and so forth. Each of the sub-portion keys can be used to provide the next set of keys (e.g., hours, minutes, seconds) using a similar process.

FIG. 6 illustrates an example 600 of deriving one or more lower level keys based on a higher level key and two distinct pieces of known information. For this example 600, both time and location are used to derive the lower-level keys. For example, a user might travel between two or more places frequently, such as between North America and Europe. An identifier can be derived depending not only on the time but also on the location. Thus, if the user is in Europe a first key is used, however, if the user is in North America, a different key is used.

Similar to the above example, a device can be given a Key, such as Key-B 602, which for this example is a key based on a week and a location. From Key-B 602, the device can include some week information 604 and some location information 606, which can be ascertained through various means or combinations of various means (e.g., calendar, global positioning system, other locating means, manual configuration, and so forth). Key-B 602 and the combination of week information 604 and location information 606 can be processed with a secure (e.g., one-way) hash algorithm 608 (or other means), which can produce an output 610. The key that a device is using at any given time is a function of both location and time, for this example. If it is Tuesday 612 and the devices (both transmitter and receiver) are in a first location 614, a first key should be used to determine a temporary identifier. However, if it is Tuesday 612 and the devices are in a second location 616, a second key should be used to determine a temporary identifier.

A receiver should be able to reconstruct, generate, or derive the keys in a similar manner as the transmitter using one of the keys to compute a temporary identifier to advertise for peer discovery. Thus, a device should be aware that the user is looking for a Buddy "X" and has Buddy X's keys by taking into account where the device is located and the time of day to determine the private identifier that Buddy X should be using at that time in that area. If Buddy X is in the vicinity, the determined temporary identifier is the identifier that Buddy X should be using.

It should be understood that while the various examples are illustrated and described with reference to time and/or location, other factors could be utilized. For example, the type of key (e.g., asymmetric, symmetric), how long the key is valid, a game the user wants to participate in/have another participate in (e.g., searching for such users), a group the user belongs to, as well as other factors that can be utilized to selectively allow discovery of a peer while maintaining issues of confidentiality can be utilized.

Figure 7:
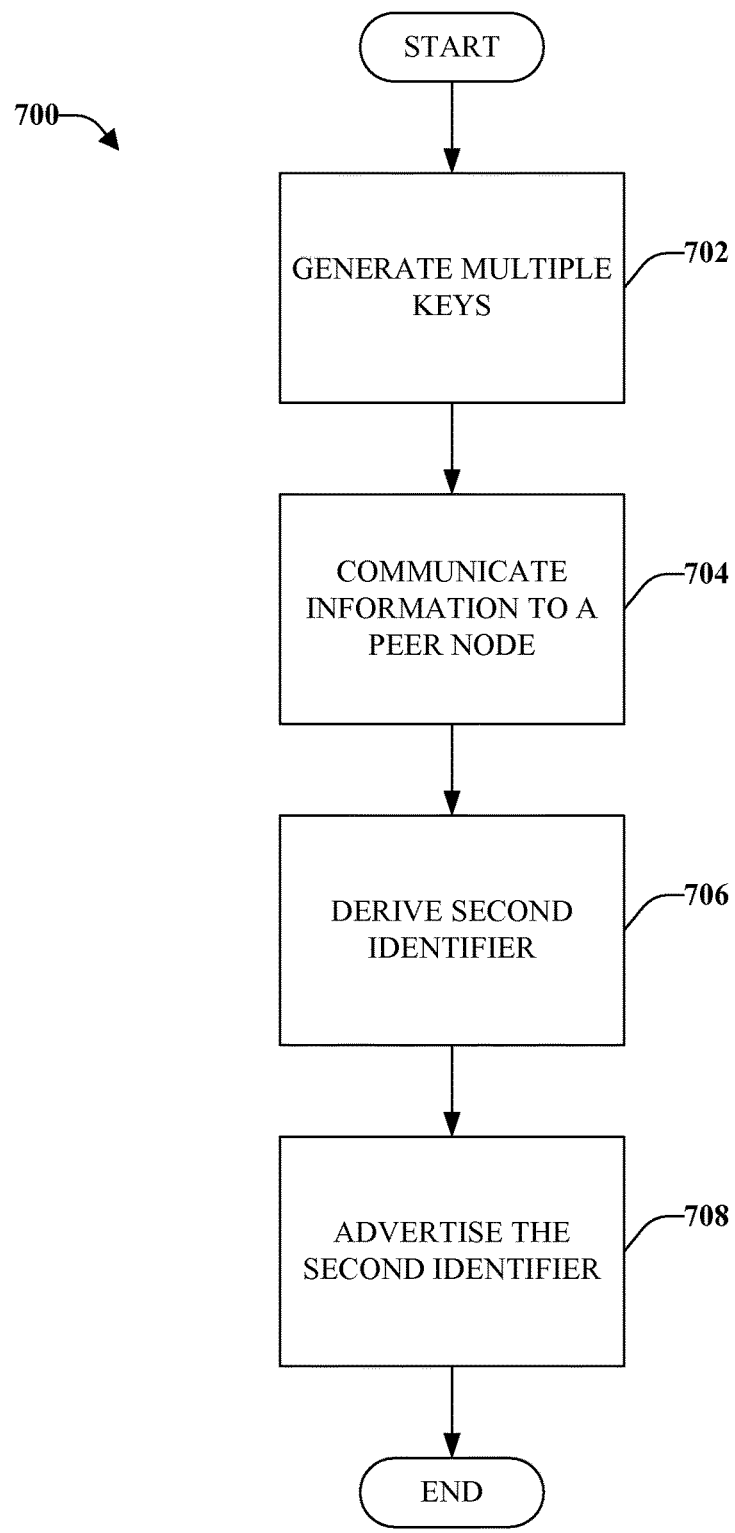
FIG. 7 illustrates a method for transmitting peer discovery information.
Figure 8:
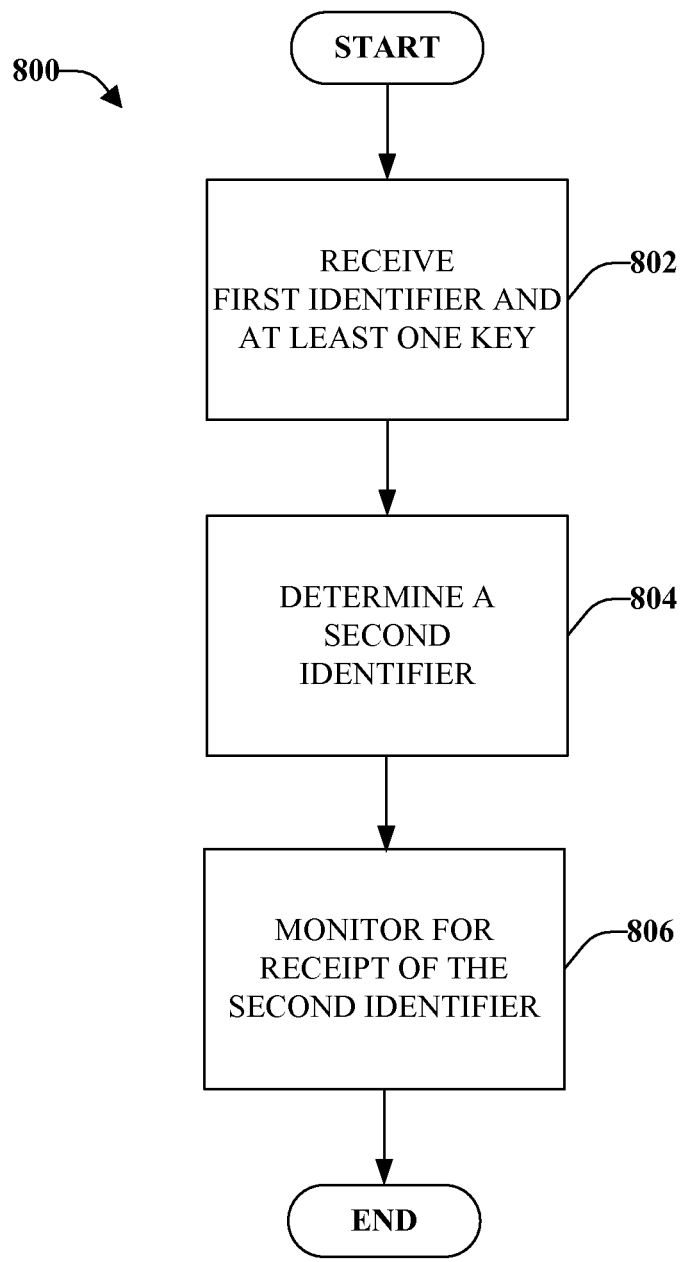
FIG. 8 illustrates a method for receiving peer discovery information.

Referring to FIGS. 7-8, methodologies relating to peer discovery are illustrated. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Now turning to FIG. 7, illustrated is a method 700 for transmitting peer discovery information. Method 700 can facilitate maintaining a level of confidentiality or anonymity in a communication network (e.g., peer-to-peer type ad hoc network) by mitigating broadcast of a first identifier associated with a device user. Method 700 allows explicitly identified peers to derive a second identifier by distributing a cryptographic key to such peers. The distributed keys can be associated with a validity range (e.g., an hour key is given to a peer that should be able to decipher the second identifier for an hour, and so forth).

Method 700 starts, at 702, with creation of a multitude of keys associated with a first identifier. In accordance with some aspects, the first identifier is a public identifier that can be chosen, assigned, and/or created. At least one key in the multitude of keys can be associated with a particular interval of time (e.g., validity period), a particular location or region (e.g., geographic region), or combinations thereof.

According to some aspects, the multitude of keys forms a hierarchy (e.g., in time or space). The hierarchy can be arranged whereby high-level keys have a longer duration and lower-level keys have a shorter duration. Each key included in the multitude of keys can be valid on a temporary basis and can expire at a predetermined frequency. In accordance with some aspects, one or more keys can be revoked at any time. The duration can be temporal-based, numerical-based, or combinations thereof. According to some aspects, the keys can be derived based on a secure hash of the public identifier and information relating to time, location, or combinations thereof.

In accordance with some aspects, an optional expiration can be associated with one or more keys. The expiration can be a validation period that has a starting point and an ending point, whereby, after the ending point, that particular key is no longer valid. The validation period can be temporal-based, numerical-based, or combinations thereof.

A recipient of a distributed key can derive keys that are at lower-levels in the hierarchy. However, higher-level keys cannot be derived from a lower-level key, thereby mitigating the chances of circumventing termination of a key based on expiration of the key. Deriving keys lower in the hierarchy can be utilized to ascertain a second identifier that a device associated with the keys is broadcasting.

At 704, the first identifier and at least one key of the multitude of keys are communicated to a first peer node. The at least one key can be conveyed or distributed in a secure manner. The first peer node is a node intended to be capable of discovering the node communicating the first identifier and the at least one key. In accordance with some aspects, the first peer node is one of a select set of peers to which the first identifier and at least one of the keys has been distributed or conveyed.

In accordance with some aspects, the peer can be explicitly identified, such as through a public identifier of the peer, a selection from a contact list, an email alias, or other information that identifies the device to which access should be allowed. Relationships with peers might not have equivalent time durations, thus, it is desirable to provide time limitations and/or controls over a time period during which explicitly related peers may discover one another. Therefore, indication of the peer can include a duration during which the peer can have access to the keys necessary to decode a public identifier from a private identifier (e.g., know when a certain user device is within vicinity).

A second identifier is derived as a function of the first identifier and the at least one key, at 706. The at least one key can be considered valid for a particular time interval, for a particular location or region (e.g., geographic region), or combinations thereof. According to some aspects, the second identifier can be derived using two or more keys of the multitude of keys. In accordance with some aspects, the second identifier is a private identifier.

At 708, the second identifier is advertised to a multitude of peer nodes. Advertising can include wireless transmission, broadcast transmission, or at least one unicast transmission of the second identifier. In accordance with some aspects, advertising includes repeatedly transmitting the second identifier, which can be periodic transmission.

In accordance with some aspects, the method can also communicate the first identifier and at least a second key (different from the first key) of the multitude of keys or a different set of keys to a second peer node.

Additionally or alternatively, a third (or subsequent) identifier can be generated as a function of the first identifier and at least a second key of the plurality of keys and the second (or previous) identifier can be invalidated. For example, if the previous identifier is compromised or has expired, the subsequent key can be generated. In accordance with some aspects, the previous and subsequent identifiers are both derived as a function of a key that is higher in a hierarchy of keys.

With reference to FIG. 8, illustrated is a method 800 for receiving peer discovery information. Method 800 facilitates identification of a related peer within a wireless environment even though the related peer announces its presence utilizing a temporary identifier.

At 802, a first identifier and at least one key associated with a peer node are received. The peer node is a node intended to be discoverable by the node that received the first identifier and the key. Thus, the first identifier and at least one key can be received from a peer that explicitly identified one or more contacts that are permitted to obtain presence information of the peer. In accordance with some aspects, the first identifier is a public identifier.

At 804, a second identifier is determined based, in part, on the first identifier and the at least one key. In accordance with some aspects, the second identifier is computed or determined based in part on time, in part on location, or combinations thereof. In accordance with some aspects, computing the second identifier includes generating at least one additional key. The at least one additional key can be associated with a particular interval of time, a particular location or region (e.g., geographic region), or combinations thereof.

In accordance with some aspects, the at least one additional key may be part of a hierarchy (e.g. in time or space). In an example, in the hierarchical order keys having a shorter duration are considered lower-level keys and keys having a longer duration are considered higher-level keys. According to some aspects, the determination of the second identifier can be made by decrypting lower-level keys in the hierarchy. The determination can be made based on various criteria including time, location, interests, social groups or combinations thereof. Decrypting the lower-level keys should be performed in substantially the same manner that was used to encrypt the keys, thus mitigating the chances of finding an incorrect current key (e.g., information is not related to peer).

At 806, receipt of the second identifier is monitored (e.g., for peer discovery purposes). In accordance with some aspects, monitoring can include receiving wireless transmissions, receiving broadcast transmission, receiving at least one unicast transmission, or combinations thereof. According to some aspects, monitoring for receipt of the second identifier can include receiving an identifier advertised by a nearby node and ascertaining if the received identifier is the determined second identifier. Thus, if the related peer is within a specific geographic range (e.g., within the peer-topeer network), the presence of the peer can be detected based on the second identifier being broadcast.

In accordance with some aspects, the method also includes invalidating a second identifier. The invalidation can be based upon notification that the second identifier is no longer valid, based on expiration or anticipated expiration of the second identifier, or based on other factors (e.g., identifier has been compromised). The method continues by deriving a third identifier as a function of the first identifier and at least a second key of the plurality of keys.

It will be appreciated that, in accordance with one or more aspects described herein, inferences can be made regarding transmission and/or reception of identifiers. As used herein, the term to "infer" or "inference" refers generally to the process of reasoning about or inferring states of the system, environment, and/or user from a set of observations as captured through events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more aspects presented above can include making inferences pertaining to creating keys arranged in a hierarchy. According to another example, an inference can be made relating to deriving a lower level key in a hierarchy based on a higher level key. In accordance with another example, an inference can be made relating to deriving one or more second identifiers from one or more first identifiers. It will be appreciated that the foregoing examples are illustrative in nature and are not intended to limit the number of inferences that can be made or the manner in which such inferences are made in conjunction with the various examples described herein.

Figure 9:
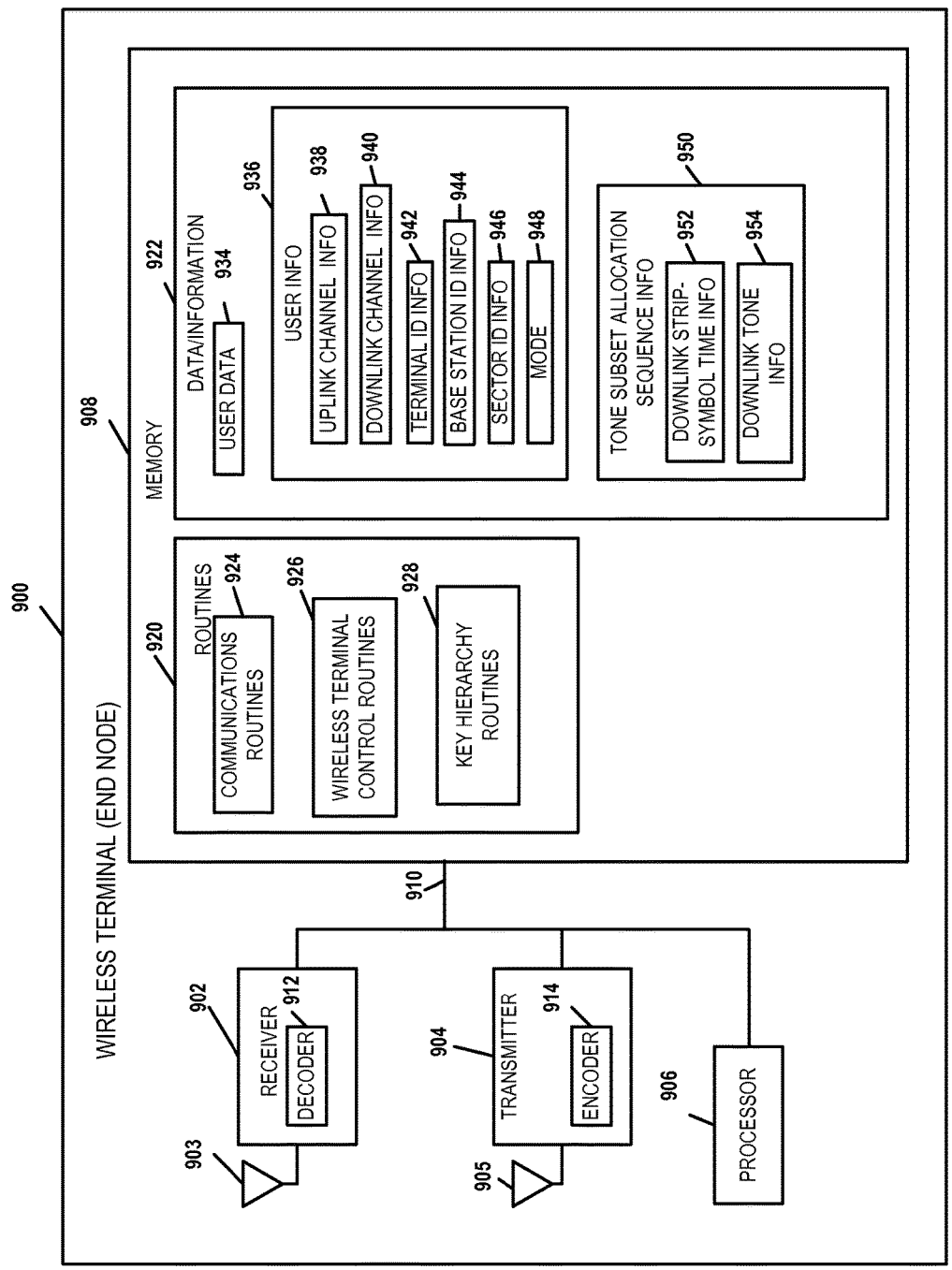
FIG. 9 illustrates an example wireless terminal in accordance with one or more of the disclosed aspects.

FIG. 9 illustrates an example wireless terminal 900 that can be used as any one of the wireless terminals (e.g., transmitter node, receiver node, . . . ), of the disclosed aspects. Wireless terminal 900 includes a receiver 902 including a decoder 912, a transmitter 904 including an encoder 914, a processor 906, and memory 908 which are coupled together by a bus 910 over which the various elements 902, 904, 906, 908 can interchange data and information. An antenna 903 used for receiving signals from a base station and/or other devices is coupled to receiver 902. An antenna 905 used for transmitting signals (e.g., to a base station and/or other wireless terminals) is coupled to transmitter 904.

The processor 906 (e.g., a CPU) controls operation of wireless terminal 900 and implements methods by executing routines 920 and using data/information 922 in memory 908. Data/information 922 includes user data 934, user information 936, and tone subset allocation sequence information 950. User data 934 may include data, intended for a peer node, which will be routed to encoder 914 for encoding prior to transmission by transmitter 904 to base station and/or other devices, and data received from the base station and/or other devices, which has been processed by the decoder 912 in receiver 902. User information 936 includes uplink channel information 938, downlink channel information 940, terminal ID information 942, base station ID information 944, sector ID information 946, and mode information 948. Uplink channel information 938 includes information identifying uplink channels segments that have been assigned by a base station for wireless terminal 900 to use when transmitting to the base station. Uplink channels may include uplink traffic channels, dedicated uplink control channels (e.g., request channels, power control channels and timing control channels). Each uplink channel includes one or more logic tones, each logical tone following an uplink tone hopping sequence. The uplink hopping sequences are different between each sector type of a cell and between adjacent cells. Downlink channel information 940 includes information identifying downlink channel segments that have been assigned by a base station for use when the base station is transmitting data/information to wireless terminal 900. Downlink channels may include downlink traffic channels and assignment channels, each downlink channel including one or more logical tone, each logical tone following a downlink hopping sequence, which is synchronized between each sector of the cell.

User information 936 also includes terminal identification information 942, which is a base station assigned identification, base station identification information 944 which identifies the specific base station that wireless terminal 900 has established communications with, and sector identification info 946 which identifies the specific sector of the cell where wireless terminal 900 is presently located. Base station identification 944 provides a cell slope value and sector identification info 946 provides a sector index type; the cell slope value and sector index type may be used to derive tone-hopping sequences. Mode information 948 also included in user information 936 identifies whether the wireless terminal 900 is in sleep mode, hold mode, or on mode.

Tone subset allocation sequence information 950 includes downlink strip-symbol time information 952 and downlink tone information 954. Downlink strip-symbol time information 952 includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 954 includes information including a carrier frequency assigned to the base station, the number and frequency of tones, and the set of tone subsets to be allocated to the strip-symbol periods, and other cell and sector specific values such as slope, slope index and sector type.

Routines 920 include communications routines 924, wireless terminal control routines 926, and key hierarchy routines 928. Communications routines 924 control the various communications protocols used by wireless terminal 900. For example, communications routines 924 may enable communicating through a wide area network (e.g., with a base station) and/or a local area peer-to-peer network (e.g., directly with disparate wireless terminal(s)). By way of further example, communications routines 924 may enable receiving a broadcast signal (e.g., from a base station). Wireless terminal control routines 926 control basic wireless terminal 900 functionality including the control of the receiver 902 and transmitter 904. Key hierarchy routines 928 control encrypting keys within a hierarchy. The keys can be a function of a first identifier and a validity range. Key hierarchy routines 928 can also control deriving lower-level keys in a key hierarchy to determine a current key that can be utilized to decrypt a received second identifier to ascertain a first identifier located with one or more peers.

Figure 10:
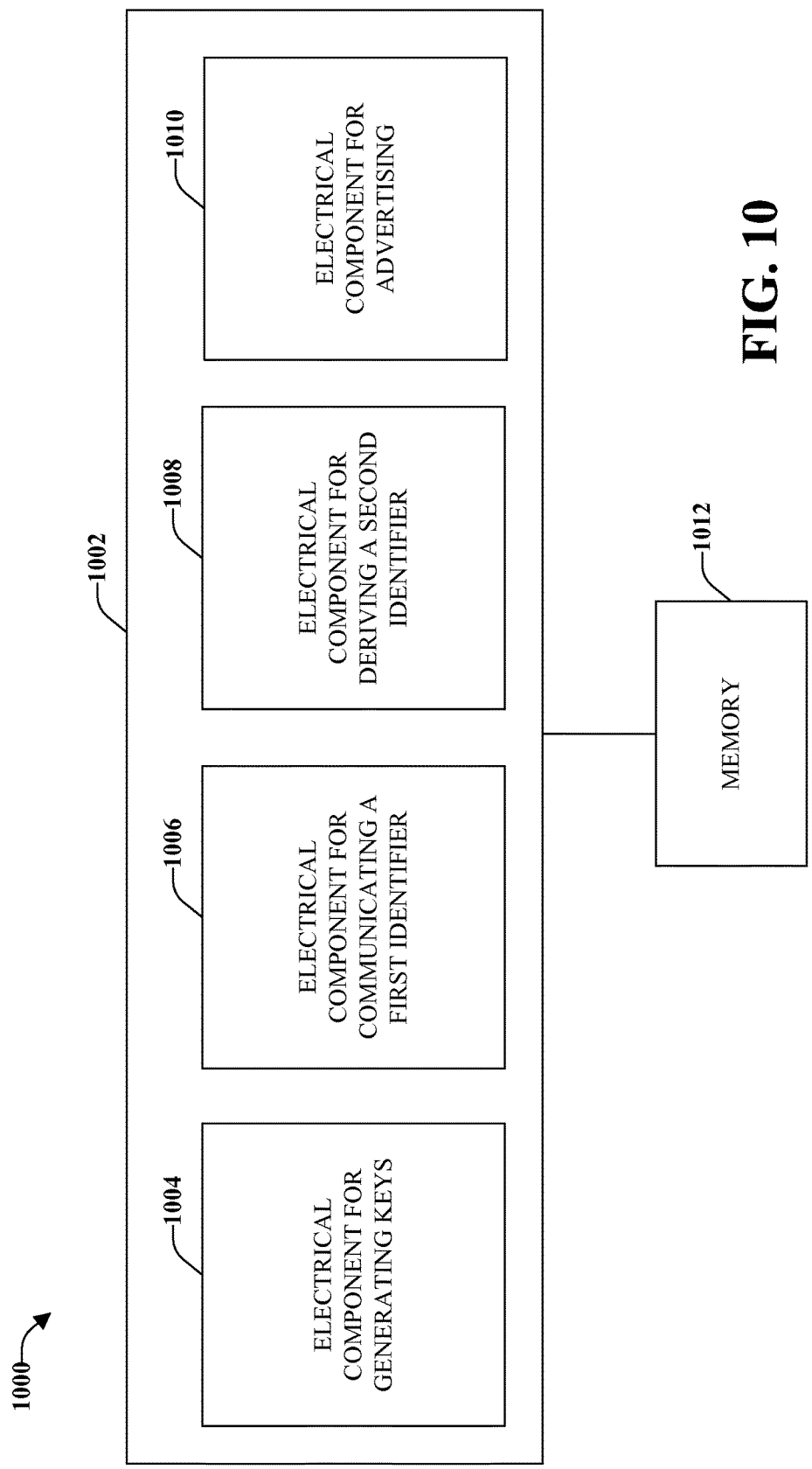
FIG. 10 illustrates an example system for transmitting peer discovery information.

With reference to FIG. 10, illustrated is an example system 1000 for transmitting peer discovery information. System 1000 can reside at least partially within a transmitting node. It is to be appreciated that system 1000 is represented as including functional blocks, which may be functional blocks that represent functions implemented by a processor, software, or a combination thereof (e.g., firmware).

System 1000 includes a logical grouping 1002 of electrical components that can act separately or in conjunction. For instance, logical grouping 1002 may include an electrical component 1004 for generating a multitude of keys associated with a first identifier. At least one key of the multitude of keys is associated with a validity period, a geographic region, or combinations thereof. Pursuant to an illustration, each key in the multitude of keys can be associated with a different validity period having a starting point and an ending point. In accordance with some aspects, the multitude of keys comprises a hierarchy.

Logical grouping 1002 also includes an electrical component 1006 for communicating the first identifier and at least one key of the multitude of keys. The first identifier and the keys can be transmitted to at least one peer node. In accordance with some aspects, the first identifier and the keys are communicated in a secure manner. In accordance with some aspects, electrical component 1006 further communicates the first identifier and at least a second key of the multitude of keys to a second peer node. According to some aspects, the first identifier is a public identifier and the second identifier is a private identifier. According to other aspects, the first identifier is a private identifier and the second identifier is a public identifier. Further, in accordance with some aspects, each identifier might have a limited scope (e.g., neither fully public nor private).

Also included in logical grouping 1002 is an electrical component 1008 for deriving a second identifier. The second identifier can be derived as a function of the first identifier and the two keys of the multitude of keys. Also included is an electrical component 1010 for advertising the second identifier to a multitude of peer nodes. Advertising the second identifier can comprise a wireless transmission. Further, advertising can be conducted for peer discovery purposes.

Additionally, system 1000 can include a memory 1012 that retains instructions for executing functions associated with electrical components 1004, 1006, 1008, and 1010 or other components. While shown as being external to memory 1012, it is to be understood that one or more of electrical components, 1006, 1008, and 1010 may exist within memory 1012.

Figure 11:
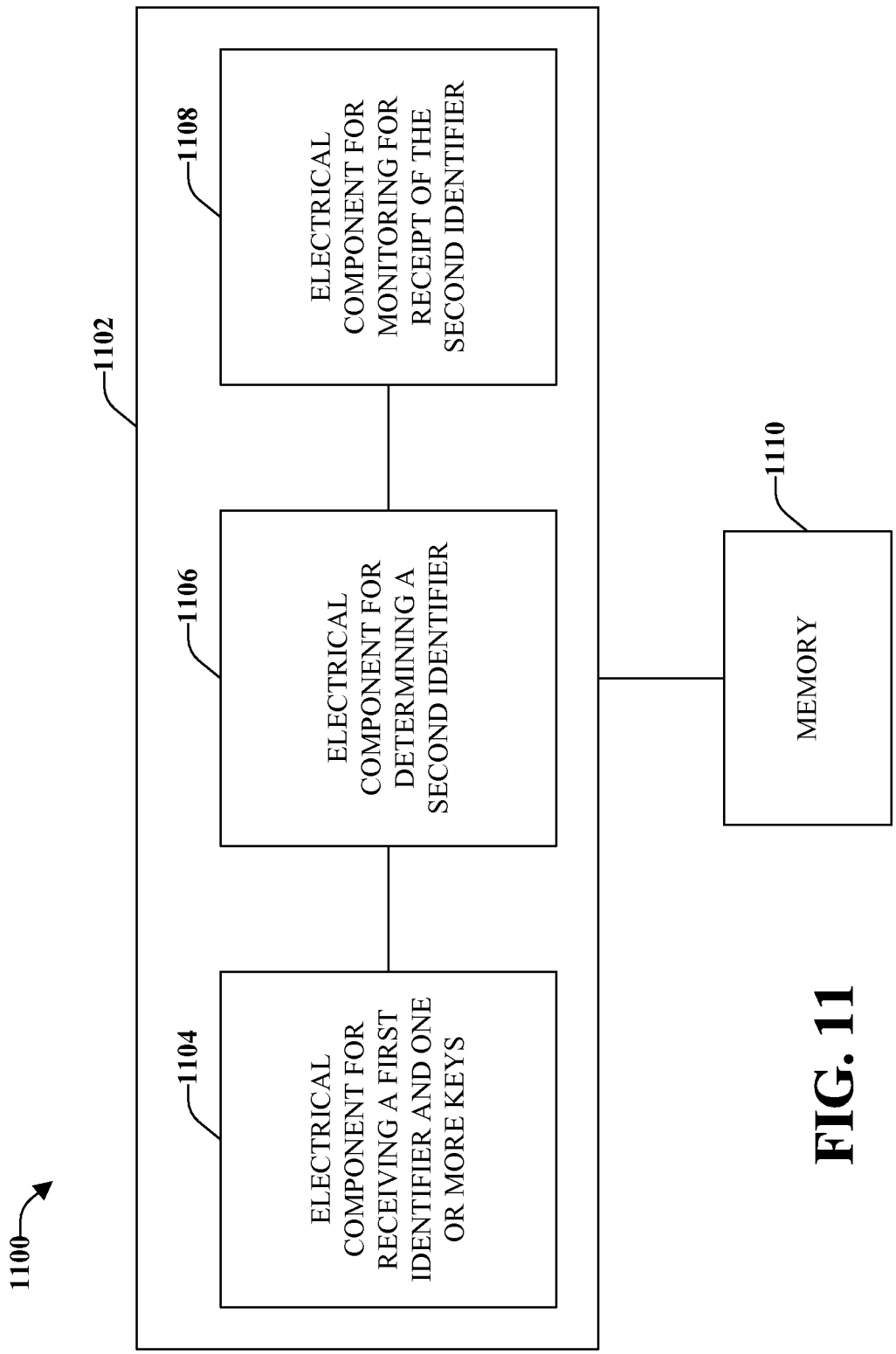
FIG. 11 illustrates an example system that receives peer discovery information.

With reference to FIG. 11, illustrated is an example system 1100 that receives peer discovery information. System 1100 can reside at least partially within a mobile device or a receiving node. It is to be appreciated that system 1100 is represented as including functional blocks, which may be functional blocks that represent functions implemented by a processor, software, or combinations thereof (e.g., firmware).

System 1100 includes a logical grouping 1102 of electrical components that can act separately or in conjunction. Logical grouping 1102 can include an electrical component 1104 for receiving a first identifier and at least one key associated with a peer node. The key can be a temporary key that has a validity period that expires after a certain time or event.

Also included is an electrical component 1106 for determining a second identifier based at least in part on the first identifier and the at least one key. In accordance with some aspects, the second identifier is determined based at least in part on time, in part on location, or combinations thereof. In accordance with some aspects, determining the second identifier can include generating at least one additional key. According to some aspects, the additional key is associated with a specific validity period, geographic region, or combinations thereof. The at least one additional key may be part of a hierarchy.

Also included in logical grouping 1102 is an electrical component 1108 for monitoring for receipt of the second identifier. Monitoring for receipt can include receiving a wireless transmission. In accordance with some aspects, the first identifier is a public identifier and the second identifier is a private identifier.

According to some aspects, logical grouping 1102 can include an electrical component for receiving an identifier advertised by a nearby node and an electrical component for ascertaining if the received identifier is the determined second identifier.

Additionally, system 1100 includes a memory 1110 that retains instructions for executing functions associated with electrical components 1104, 1106, and 1108. While shown as being external to memory 1110, it is to be understood that one or more of electrical components 1104, 1106, and 1108 may exist within memory 1110.

It is to be understood that the aspects described herein may be implemented by hardware, software, firmware or any combination thereof. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or aspects, it should be noted that various changes and modifications could be made herein without departing from the scope of the described aspects and/or aspects as defined by the appended claims. Accordingly, the described aspects are intended to embrace all such alterations, modifications and variations that fall within scope of the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description of the claims is meant to be a "non-exclusive or".

What is claimed is:

1. A method for transmitting peer discovery information by a user equipment (UE), comprising:
   generating, by the UE, a plurality of different keys associated with a first identifier;
   communicating, by the UE, the first identifier and at least one key of the plurality of different keys to a first peer device of a plurality of peer devices, the at least one key facilitating the first peer device to determine an association between the first identifier and a second identifier used for peer discovery, wherein the at least one key is derived as a function of the first identifier and information that is related to at least one of a time period or a geographical location;
   deriving, by the UE, the second identifier as a function of the first identifier and the at least one key of the plurality of different keys; and advertising, by the UE, the second identifier to the plurality of peer devices for peer discovery after communicating the first identifier.

2. The method of claim 1, wherein each of the plurality of different keys including the at least one key is associated with a parameter that comprises a validity period or a geographic region.

3. The method of claim 1, wherein the plurality of different keys comprises a hierarchy.

4. The method of claim 1, wherein the first identifier and the at least one key are communicated in a secure manner.

5. The method of claim 1, further comprising communicating, by the UE, the first identifier and at least a second key of the plurality of different keys to a second peer device, wherein the second key is different than the at least one key.

6. The method of claim 1, wherein the second identifier is derived as a function of the first identifier and at least two different keys of the plurality of different keys.

7. The method of claim 1, wherein the first identifier is a public identifier and the second identifier is a private identifier.

8. The method of claim 1, further comprising:
generating, by the UE, a third identifier as a function of the first identifier and at least a second key of the plurality of different keys; and
invalidating, by the UE, the second identifier.

9. An apparatus, comprising:
a memory retaining instructions for generating a plurality of different keys associated with a first identifier; communicating the first identifier and at least one key of the plurality of different keys to a first peer node of a plurality of peer nodes, the at least one key facilitating the first peer node to determine an association between the first identifier and a second identifier used for peer discovery, wherein the at least one key is a function of the first identifier and information that is related to at least one of a time period or a geographical location; deriving the second identifier as a function of the first identifier and the at least one key of the plurality of different keys; and advertising the second identifier to the plurality of peer nodes for peer discovery after communicating the first identifier; and
a processor, coupled to the memory, configured to execute the instructions retained in the memory.

10. The apparatus of claim 9, wherein each of the plurality of different keys including the at least one key is associated with a parameter that comprises a validity period or a geographic region.

11. The apparatus of claim 9, wherein the plurality of different keys comprises a hierarchy.

12. The apparatus of claim 9, wherein the memory further retains instructions related to communicating the first identifier and at least a second key of the plurality of different keys to a second peer node, wherein the second key is different than the at least one key.

13. The apparatus of claim 9, wherein the second identifier is derived as a function of the first identifier and at least two different keys of the plurality of different keys.

14. The apparatus of claim 9, wherein the memory further retains instructions related to generating a third identifier as a function of the first identifier and at least a second key of the plurality of different keys and invalidating the second identifier.

15. The apparatus of claim 9, wherein the first identifier is a public identifier and the second identifier is a private identifier.

16. An apparatus, comprising:
means for creating a plurality of different keys associated with a first identifier;
means for conveying the first identifier and at least one key of the plurality of different keys to a first peer node of a plurality of peer nodes, the at least one key facilitating the first peer node to determine an association between the first identifier and a second identifier used for peer discovery, wherein the at least one key is derived as a function of the first identifier and information that is related to at least one of a time period or a geographical location;
means for deriving the second identifier as a function of the first identifier and the at least one key of the plurality of different keys; and
means for advertising the second identifier to the plurality of peer nodes for peer discovery after conveying the first identifier.

17. The apparatus of claim 16, wherein each of the plurality of different keys including the at least one key is associated with a parameter that comprises a validity period or a geographic region.

18. The apparatus of claim 16, wherein the second identifier is derived as a function of the first identifier and at least two different keys of the plurality of different keys.

19. A computer program product, comprising a non-transitory computer readable medium for storing instructions that, when executed by a processor, cause the processor to:
generate a plurality of different keys associated with a first identifier;
communicate the first identifier and at least one key of the plurality of different keys to a first peer node of a plurality of peer nodes, the at least one key facilitating the first peer node to determine an association between the first identifier and a second identifier used for peer discovery, wherein the at least one key is derived as a function of the first identifier and information that is related to at least one of a time period or a geographical location;
derive the second identifier as a function of the first identifier and the at least one key of the plurality of different keys; and
advertise the second identifier to the plurality of peer nodes for peer discovery after communicating the first identifier, wherein the at least one key of the plurality of different keys is associated with a parameter that comprises a validity period or a geographic region.

20. The computer program product of claim 19, wherein the non-transitory computer readable medium further stores instructions that cause the processor to:
communicate the first identifier and at least a second key of the plurality of different keys to a second peer node, wherein the second key is different than the at least one key.

21. An apparatus for use in transmitting peer discovery information, comprising:
a memory; and
at least one processor coupled to the memory and configured to:
create a plurality of different keys associated with a first identifier;
communicate the first identifier and at least one key of the plurality of different keys to a first peer node of a plurality of peer nodes, the at least one key facilitating the first peer node to determine an association between the first identifier and a second identifier used for peer discovery, wherein the at least one key is derived as a function of the first identifier and information that is related to at least one of a time period or a geographical location;

derive the second identifier as a function of the first identifier and the at least one key of the plurality of different keys; and advertise the second identifier to the plurality of peer nodes for peer discovery after communicating the first identifier.

* * * * *